United States Patent [19]
Kiencke

[11] 3,943,898
[45] Mar. 16, 1976

[54] ELECTRONIC TIMING CIRCUIT FOR ENGINE IGNITION

[75] Inventor: Uwe Kiencke, Moglingen, Germany

[73] Assignee: Robert Bosch GmbH, Stuttgart, Germany

[22] Filed: May 14, 1974

[21] Appl. No.: 469,777

[30] Foreign Application Priority Data
June 7, 1973    Germany............................ 2329046

[52] U.S. Cl..... 123/117 R; 123/146.5 A; 123/148 E
[51] Int. Cl.²............................................. F02P 5/04
[58] Field of Search...... 123/117 R, 146.5 A, 148 E

[56] References Cited
UNITED STATES PATENTS

| | | | |
|---|---|---|---|
| 3,592,178 | 7/1971 | Schiff | 123/148 E |
| 3,738,339 | 6/1973 | Huntzinger et al. | 123/117 R |
| 3,749,073 | 7/1973 | Asplund | 123/117 R |
| 3,756,212 | 9/1973 | Schirmer et al. | 123/148 E |
| 3,757,755 | 9/1973 | Carner | 123/148 E |
| 3,780,587 | 12/1973 | Rivere | 73/398 R |
| 3,800,757 | 4/1974 | Finch | 123/148 E |
| 3,830,207 | 8/1974 | Joseph | 123/148 E |
| 3,855,973 | 12/1974 | Scofeild | 123/32 EA |

Primary Examiner—Charles J. Myhre
Assistant Examiner—P. Devinsky
Attorney, Agent, or Firm—William R. Woodward

[57] ABSTRACT

Engine ignition is timed for each ignition cycle from a reference pulse corresponding to the time a piston in a particular one of the cylinders of the engine is at its upper dead-center point. This pulse is utilized to reset a counter that counts a series of pulses corresponding to each 1° of revolution of the crankshaft. The output of the counter is furnished to an evaluation circuit in which there is wired logic for the basic ignition timing and additional logic to take account of engine operating conditions, such as engine speed, engine temperature and intake manifold pressure. In an engine requiring unsymmetrical ignition timing, a pulse for each revolution of the cam shaft is utilized in an additional logic circuit to control a timing shift for alternate revolutions of the crankshaft. The pulses produced by the evaluation circuit are furnished to an ignition pulse generation circuit, which provides ignition pulses to the ignition system.

4 Claims, 6 Drawing Figures

ELECTRONIC TIMING CIRCUIT FOR ENGINE IGNITION

This invention relates to an electronic ignition timing pulse generating circuit for an internal combustion engine and, in particular, to such a circuit for an engine which is provided with a pulse generator providing a sequence of pulses corresponding to equal increments of rotation of the crankshaft of the engine, for example 360 pulses per revolution, each corresponding to 1° of rotation.

In known ignition pulse generating systems the timing of the ignition pulses is determined with reference to ignition timing start points, which are fixed angular locations of the crankshaft located about 60° before the upper deadpoint of the respective pistons of each of the cylinders of the engine. These ignition start points form the starting point for determination of the actual ignition timing, which is subject to the momentary conditions of the engine, such as speed, temperature and intake manifold vacuum. The number of ignition timing start points referred to the crankshaft is equal to half the number of the pistons of the engine, whereas referred to the cam shaft there are as many ignition timing start points as the number of pistons.

In a known ignition timing system, a signal transmitter is provided with a rotor revolving at a speed proportional to the crankshaft speed that causes an integrator to provide a control pulse for ignition timing. This integrator is thereby put into action and builds the sum of a pulse sequence supplied by a second signal transmitter, likewise coupled to the crankshaft, the length of this pulse sequence being dependent upon the angle of rotation through which the crankshaft passes during the particular interval. At the output of the integrator there appears a staircase form signal with a rate of climb corresponding to the angular velocity of the crankshaft. The output voltage of the integrator is supplied to a comparator to which is also supplied a comparison voltage taking account of the current operating conditions of the engine. As soon as the two input voltages of the comparator reach a certain selective relation to each other, an ignition pulse is triggered and the integrator is at the same time reset. The next pulse of the first-mentioned signal transmitter then causes the operations just described to be repeated.

The difficulty of the system just described is due partly to the lack of precision of the integrator signal, the starting point of which and the rate of climb of the output voltage of which require accurate and uniform signals and partly in the nature of the comparison voltage carrying the information of the operation conditions of the engine, the magnitude of which corresponds to the sum of the individual influencing magnitudes, for example speed, temperature, loading, fuel, etc. Even though the generation of these magnitudes ought not to produce any particular difficulties, a superimposition of the individual measurements to combine their effects is certainly not easily provided. Special problems occur in this regard in the case of unsymmetrical ignition timing for multi-cylinder engines.

It is an object of the present invention, accordingly, to provide the basic ignition timing pulses, which may be referred to as the timing start pulses, on a basis which determines them with reference to a single specified point or positon of each crankshaft revolution.

SUBJECT MATTER OF THE PRESENT INVENTION

Briefly, the upper dead-center point of a piston in one of the cylinders of the engine is used as a start of the timing operation for each revolution of the crankshaft and means are provided to produce an electrical pulse when the crankshaft passes through this point to reset a continuously running binary counter arranged to count pulses of which a certain number, for example 360, are produced for every revolution of the crankshaft at a rate corresponding to crankshaft speed. The outputs of the counter are supplied to an evaluation circuit that may be referred to as a computer means which determines the timing of the timing start pulses by the progress of the count, but subject also to taking account of the operating conditions of the engine. As previously mentioned, as soon as the upper deadpoint of the piston in the reference cylinder is again reached, the counter is reset to zero and starts over.

In a further development of the invention the evaluation circuit stores the angle of rotation through which the crankshaft must pass between the upper deadcenter point of the piston in the reference cylinder, and each of the ignition timing start points in the form of wired logic connections for the corresponding counting magnitudes that will be registered by the counter at those respective points. Furthermore, in the case of unsymmetrical timing a logic circuit is provided responsive both to a signal from the reference deadpoint and to another signal transmitter operated by cam shaft that makes only one revolution for the entire ignition cycle to produce an output furnished to the evaluation circuit to change its setting back and forth between settings for alternate revolutions of the crankshaft.

The advantages obtainable with the invention consist particularly in the requirement of only a single accurate signal per revolution of the crankshaft to which all the ignition timing may be referred, this single accurate signal being conveniently derived from the upper deadcenter point of the piston of one of the cylinders of a multi-cylinder engine. This represents the possibility of a substantial saving for the motor manufacturer.

The timing intervals reckoned from the upper deadcenter point of the piston in one of the cylinders provide the starting points for the corresponding determination of the actual ignition timing, which is automatically shiftable in response to certain engine conditions. A distributor, of course, is used to distribute the ignition pulses to the sparkplugs of the various cylinders.

The invention is further described by way of example with reference to the annexed drawings, in which.

Figure 1:
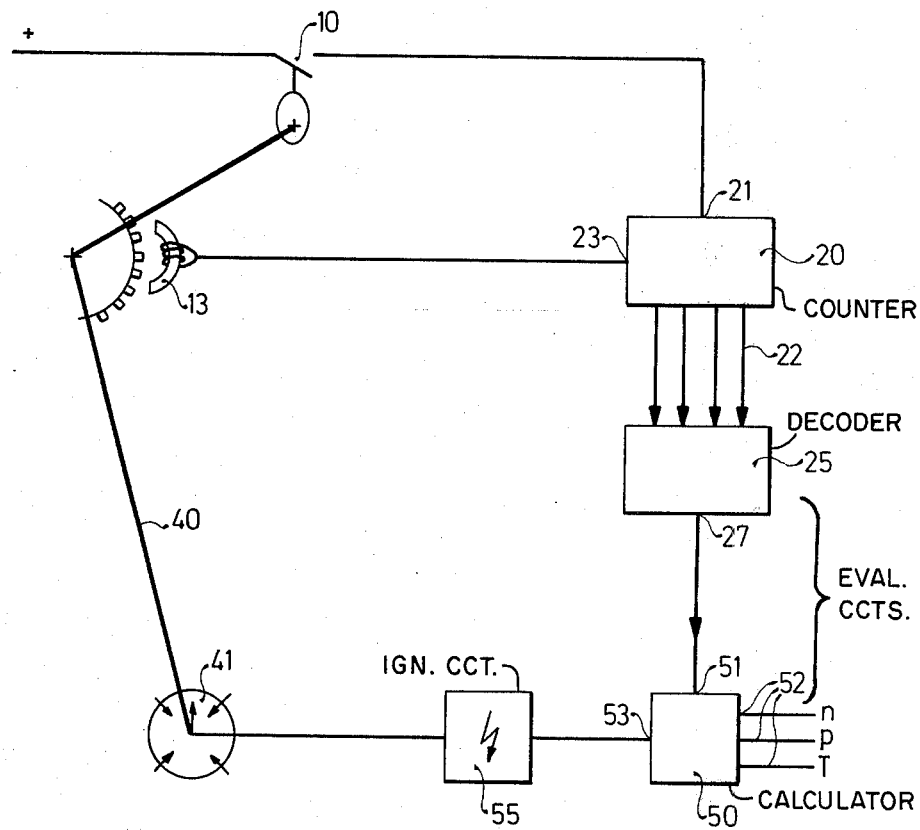
FIG. 1 is a block diagram of an electronic ignition timing system for an engine requiring symmetrical ignition timing.

As shown in FIG. 1, the positive pole of a direct current source not shown in the drawing is connected with the reset input 21 of a counter 20 through a switch 10 operated by the crankshaft for marking the moment in which the piston in the reference cylinder is at its upper dead-center point. The counting pulse input 23 of the counter 20 is connected to an angular displacement indicator transmitter 13 provided to register angular displacement of the crankshaft. The counter 20 is of conventional form and may be, for example, of the RCA type commercially available under the designation CD 4029. The outputs of the counter 20 are provided over the conductors 22 to an evaluation circuit 25 built up of logic gates. This evaluation circuit is also a conventional commercially available circuit unit, sometimes called a decoder, for example the Texas Instruments type TMS 2000 JG. The block 50 of the diagram represents a second stage of evaluation connected over the conductor 27 with the evaluation circuit 25 for causing the ignition timing to be modified by measured values of operating parameters of the engine, such as, for example, the pressure p, the speed n and the temperature T. Such circuits are also known in the art. Some suitable forms of construction for the block 50 are illustrated by the calculating circuits shown in U.S. Pat. No. 3,756,212. It is to be understood, however, that the functions represented by the separate blocks 25 and 50 may be built into a single stage or in separate stages as indicated on FIG. 1, according to the nature of the influence to be produced in the circuit by the aforesaid operating parameters. The timing pulses as determined by the evaluation circuit are finally supplied on an ignition circuit 55 which produces pulses of a voltage suitable for ignition, which are distributed to the respective sparkplugs of the engine cylinders through a distributor 41 driven by a cam shaft 40 connected to the crankshaft.

Figure 2:
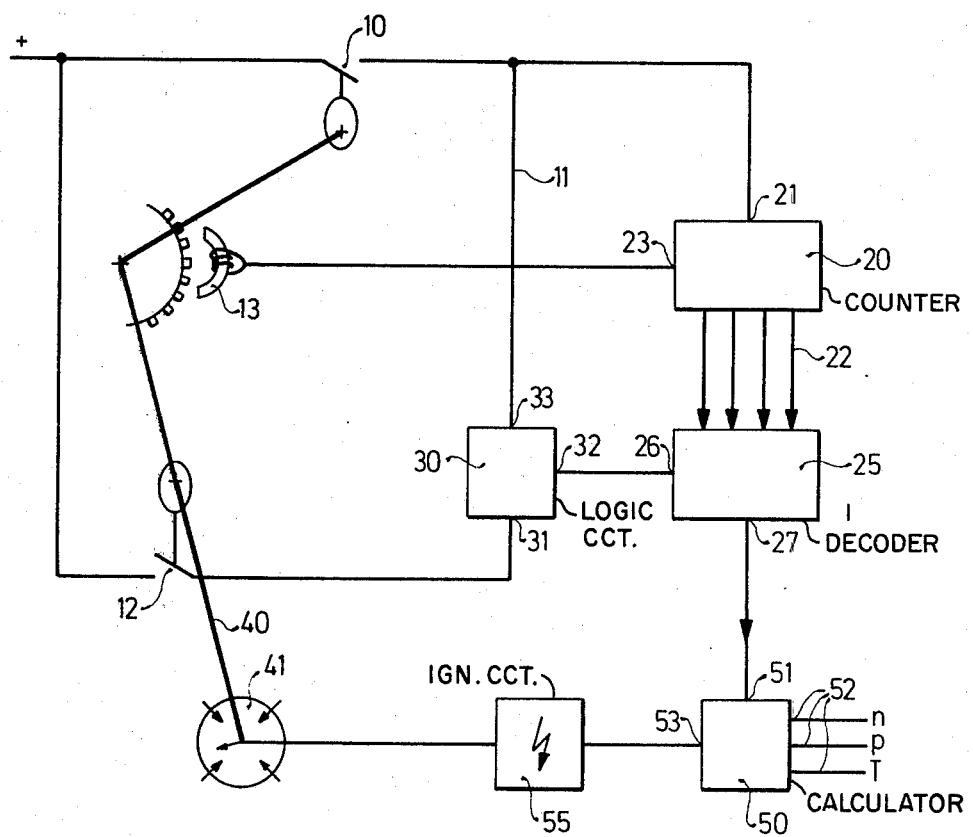
FIG. 2 is a corresponding block diagram for the case of an engine requiring unsymmetrical ignition timing.

FIG. 2 shows a block diagram for the electronic generation of timing pulses for unsymmetrical timing. The circuit components which also appear in FIG. 1 are here given the same reference numerals. The circuit of FIG. 2 has an additional connection leading from the positive pole of the d.c. source (not shown), over a signal generator actuated by the cam shaft 40, for example a pulse generator producing one pulse per revolution of the cam shaft, over to the input 31 of a logic circuit 30. The second input 33 of the logic circuit 30 is connected over a conductor 11 with the circuit which provides one pulse per revolution of the crankshaft when the piston in the reference cylinder is at its upper dead-center point, this being the same pulse, or rather sequence of pulses, that is supplied to the resetting input 21 of the counter 20. The output 32 of the logic circuit 30 is connected to an additional input of the evaluation circuit 25.

Figure 3A:
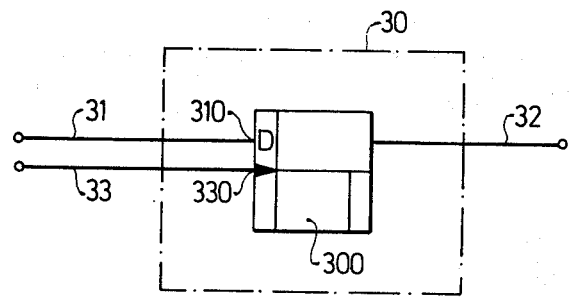
FIG. 3a is a diagram showing the circuit of a logic circuit required particularly for the case of unsymmetrical timing.

The form of the logic circuit 30 of FIG. 2 which is shown in FIG. 3a comprises a D-flipflop circuit 300 with a setting pulse input 310 and a synchronizing input 330. The characteristics and constitution of D-flipflop circuits are explained in "Digital Electronics in Measurements and Data Processing" by Dokter Steinhauer, published in the Philips textbook series, pages 11–21. Pages 46 and 47 of the same text show a forward counting circuit.

The noninverting output of the D-flipflop circuit 300 is used to supply the output of the logic stage 30 to the evaluation circuit 25.

Figure 3B:
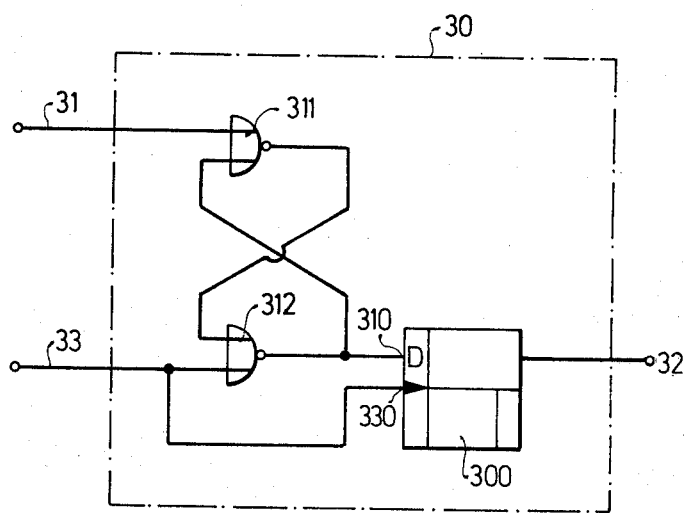
FIG. 3b is a diagram of another form of logic circuit of the kind particularly required for unsymmetrical ignition timing.

In the circuit illustrated in FIG. 3b for the logic circuit 30 of FIG. 2, a bistable flipflop circuit composed of the NOR-gates 311 and 312 receives the inputs 31 and 33 of the logic stage 30. The input 33 of FIG. 2 is in this case one input to the NOR-gate 312, the output of which is coupled to the setting signal input of the D-flipflop circuit 300. This same input 33 is also applied to the synchronizing input 330 of the D-flipflop circuit 300, the output of which constitutes the output 32 of the logic circuit as a whole.

FIG. 3b shows the cross-connections of the NOR-gates 311 and 312, which provide the bistable operation of this circuit.

Operation of the Circuits of FIG. 1 and FIG. 2.

The closing of a switch 10 marks the upper deadcenter position of one of the pistons, this being the case both in FIG. 1 and FIG. 2. This momentary connection through the contacts of the switch 10 operated by the crankshaft clears the count information contained in the counter 20, resetting this counter to zero. As the crankshaft continues to revolve, the angular displacement pulse generator 13 produces a sequence of pulses the length of which sequence at any moment corresponds to the displacement of the crankshaft since passing the upper deadpoint of the piston in the reference cylinder, and this pulse sequence advances the counter 20 progressively. The count value is supplied to the evaluation circuit 25 over the conductors 22 and the evaluation circuit 25 provides preliminary ignition timing signals at its output 27. These go to the additional stage 50 of the evaluation circuit where these preliminary ignition timing signals are used as starting values for the determination of the final ignition timing by taking account of the speed $n$, the temperature $t$ and the pressure $p$, as provided by measurements made on the engine. The actual ignition pulses are produced by the ignition circuit 55 and they are then directed in turn to the sparkplugs of the individual cylinders by means of the distributor 41.

A four-cylinder internal combustion engine is convenient for consideration as a first example. The crankshaft will of course perform twice as many revolutions as the cam shaft, because of the four-stroke cycle of the engine in each cylinder. During a half revolution of the cam shaft or a full revolution of the crankshaft, it is accordingly necessary to produce two ignition pulses. In the case of symmetrical ignition, these are accordingly 180° of the crankshaft revolution apart from each other, hence the ignition points are in opposed position. For triggering these ignition pulses, two timing pulses are necessary and these will have their timing controlled by the counting results of the counter in the circuits previously described. When the count produced in the counter 20 corresponds with a count stored in binary form in the evaluation circuit 25 and corresponding to the predetermined rotation angle of the crankshaft, the evaluation circuit 25 produces a timing pulse.

Figure 4A:
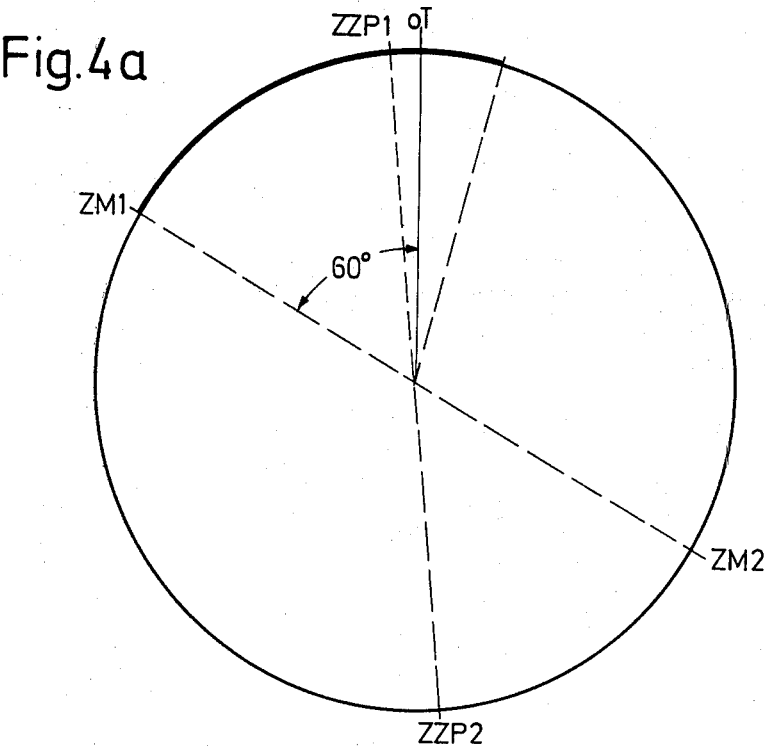
FIG. 4a is a circle diagram for graphical representation of the oppositely disposed ignition timing locations for a four-cylinder engine during one revolution of the crankshaft.

In the case of unsymmetrical ignition, a cam shaft signal is necessary for unambiguous determination of the individual timing signals. In the corresponding circuits of FIG. 2, there is utilized for this purpose not only a cam shaft signal produced by the pulse generator 12, but also a dead-center point signal from the switch 10 as a synchronizing pulse for the logic circuit 30. In this arrangement the cam shaft signal can be quite inaccurate, because the precision of synchronization is provided by the dead-center signal. A pulse sent out by the transmitter 12 and supplied to the logic circuit 30 over its input 31, as shown in FIG. 1, goes to the setting pulse input 310 of the D-flipflop circuit 300, but an output is produced only in connection with a signal produced by the deadcenter point switch 10. The circuit of FIG. 3b has the advantage compared with the circuit of FIG. 3a of providing an accurately defined signal at the setting pulse input 310 of the D-flipflop circuit 300. In this circuit both the dead-center point signal from the switch 10 and the cam shaft signal from the transmitter 12 produces a switching over of the bistable flipflop stage constituted of the two NOR-gates 311 and 312. The pulses produced at the output 32 of the logic stage 30 are supplied to the input 26 of the evaluation stage 25 for recognizing which of the alternate revolutions of the crankshaft is in progress. The significance of this factor is best understood with reference to FIGS. 4a and 4b. FIG. 4a is a diagram relating to the symmetrical timing of a four-cylinder internal combustion engine. In FIG. 4a both the pre-timing points ZM1 and ZM2 and also the ignition time points ZZP1 and ZZP2 are disposed symmetrically with respect to the center of the circle, which represents the cranskhaft revolution. The pre-timing point ZM1 here lies about 60° before the upper dead-center point of the reference piston, that is, the upper dead-center point which results in the closing momentarily of the switch 10. The ignition time point ZZP1 related to the pre-timing point ZM1 is disposed somewhat in advance of this upper deadcenter point. As the result of the symmetrical timing, it is sufficient in this example to determine two pre-timing points and hence the computation of two ignition time points, since successive sparks in the firing order of the cylinders succeed each other with equal time intervals and each piston has only one power stroke during two revolutions of the crankshaft.

Figure 4B:
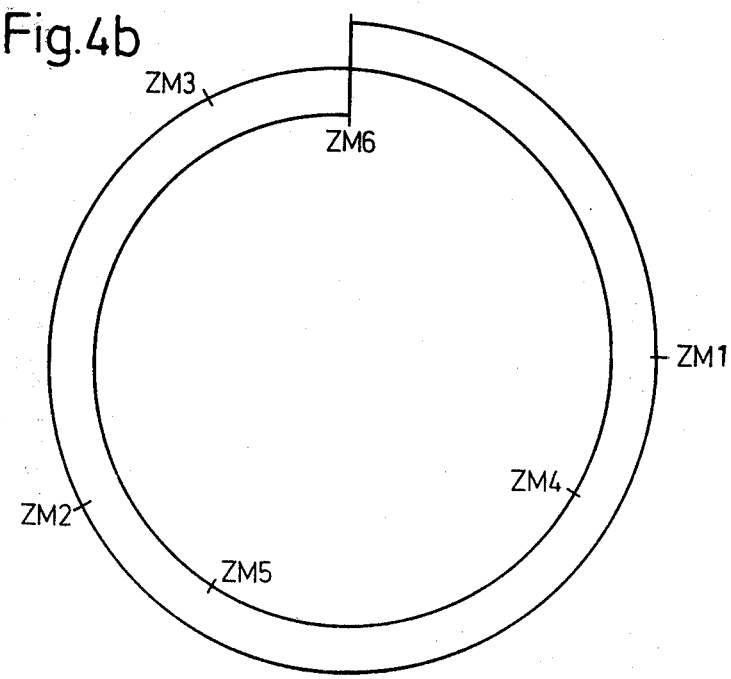
FIG. 4b is a circle diagram for graphical representation of the position of the ignition timing locations of a six-cylinder engine using unsymmetrical timing.

FIG. 4b shows a circle diagram for the pre-timing points of a six-cylinder internal combustion engine having unsymmetrical ignition timing. In this case the pre-timing points, and likewise the related ignition time points, have a staggered distribution over a single cam shaft revolution, which is to say, over two crankshaft revolutions. In other words, the pre-timing points and the corresponding ignition time points for one revolution of the crankshaft are shifted in time compared to the rhythm determined by the corresponding points in the preceding and succeeding revolutions of the crankshaft.

The resetting of the counter 20 for each revolution of the crankshaft takes place by operation of the switch 10, which occurs at the same phase of the crankshaft revolution for every revolution, so that the counting cycle of the counter 20 in each case corresponds to one crankshaft revolution.

In order that the evaluation circuit 25 may be able to distinguish between the two crankshaft revolutions that occur during a single cam shaft revolution, a supplementary signal must be processed in the evaluation circuit. This signal is delivered by the logic circuit 30 and it occurs only once during a cam shaft revolution. This enables the evaluation circuit 25 to distinguish between the two equal counting cycles that are completed during a single cam shaft revolution. Wired logic thus identifies the alternate counting cycles, so that unsymmetrically disposed pretiming points can be used. Whether the pre-timing points are symmetrical or unsymmetrical makes no difference for the following computation of the ignition time points, which follow the pre-timing points in the same manner in each case. The period between the pre-timing point and the ignition time takes account of the momentary operation parameters of the engine, as for example the speed $n$, the pressure $p$ (for example in the intake manifold) and the temperature T, these factors affecting the relative advance or retard of the ignition timing in a well-known manner that need not be described further here.

The mechanically controlled switch 10 is merely a symbolic indication of a means for indicating when the crankshaft is in such a position that the piston in a particular cylinder is at its upper dead-center point. There are a variety of transmitting devices that can provide a reference pulse of this character that are suitable for this purpose, provided that there is the desired accuracy for the generation of a pulse at the moment the piston in the reference cylinder is in its upper dead-center position. Other modifications and variations are also possible within the concept of the present invention. For example, instead of providing a pulse transmitter 13 that produces 360 pulses for each revolution of the crankshaft, thus one pulse for 1° of rotation, it is of course possible to provide a pulse transmitter that produces more than 360 pulses per revolution or less than 360 pulses per revolution. It is, however, important that the number of pulses per revolution be a rational multiple, which may be a rational fractional multiple, of 360 per revolution and perferably a simple multiple of this character, since it is desirable to have the pre-timing pulse precede the ignition pulse by about 60°.

I claim:

1. Apparatus for electronic generation of ignition timing pulses for an internal combustion piston engine having a plurality of pistons respectively operating in a plurality of cylinders to drive a common crankshaft, comprising:

means (13) for generating a sequence of pulses corresponding to equal increments of rotation of the crankshaft of the engine such that a multiplicity of pulses is produced during every complete revolution of the crankshaft;

counting means (20) for counting pulses of said sequence, including output means having a plurality of binary digit outputs for providing an output representative of crankshaft position with reference to the upper dead-center point of a permanently preselected piston of said engine;

evaluation circuit means (25, 50) responsive to outputs of said counting means and also to variations of at least one selected engine operation condition, for providing ignition timing pulses to the ignition system of said engine, said selected engine operation conditions, of which said evaluation circuit means is responsive to at least one, being engine speed, a temperature measured in the engine, and a pressure measured in the engine, said evaluation circuit means containing a circuit having logic connections arranged for detecting when said counting means reaches values of count respectively equal to predetermined angles of rotation of said crankshaft from a position in which said preselected piston of the engine is at its upper dead-center point; and resetting means (10) for resetting said counting means (20) to a count starting condition when said preselected piston of the engine is at its upper dead-center point.

2. Apparatus for electronic generation of ignition timing pulses as defined in claim 1, in which said engine requires unsymmetrical igntion timing and in which second pulse generating means (12) are provided for actuation by a cam shaft of said engine during alternate revolutions of said crankshaft, and in which, further, logic means are provided responsive to the provision of pulses during said alternate revolutions by said second pulse generation means and also responsive to pulses provided by said resetting means when a piston of the engine is at its upper dead-center point, for supplying an output to said evaluation circuit means for shifting the timing of said ignition timing pulses back and forth for alternate revolutions of said crankshaft.

3. Apparatus for electronic generation of ignition timing pulses as defined in claim 2, in which said logic means comprises a D-flipflop circuit having a synchronizing input (330) connected to the output of said resetting means (10) and having a setting signal input (310) connected to the output of said second pulse generating means (12).

4. Apparatus for electronic generation of ignition timing pulses as defined in claim 2, in which said logic means comprises a first (311) and a second (312) NOR-gates cross-connected, so that the output of one forms one of the inputs of the other, and also a D-flipflop circuit (300) having its signal setting input (310) connected to the output of said second NOR-gate (312) and its synchronizing input (330) connected to the output of said resetting means (12), to which the non-cross-connected input of said second NOR-gate is also connected, and in which, further, the non-cross-connected input of said first NOR-gate is connected to the output of said second pulse generating means.

* * * * *

UNITED STATES PATENT AND TRADEMARK OFFICE
CERTIFICATE OF CORRECTION

PATENT NO. : 3943898
DATED : March 16, 1976
INVENTOR(S) : Uwe KIENCKE

It is certified that error appears in the above—identified patent and that said Letters Patent are hereby corrected as shown below:

In column 7 of the patent, line 14, claim 2, "a" appearing before "piston" should be changed to -- said preselected --.

Signed and Sealed this eighth Day of June 1976

[SEAL]

Attest:

RUTH C. MASON
Attesting Officer

C. MARSHALL DANN
Commissioner of Patents and Trademarks